United States Patent Office 3,592,600
Patented July 13, 1971

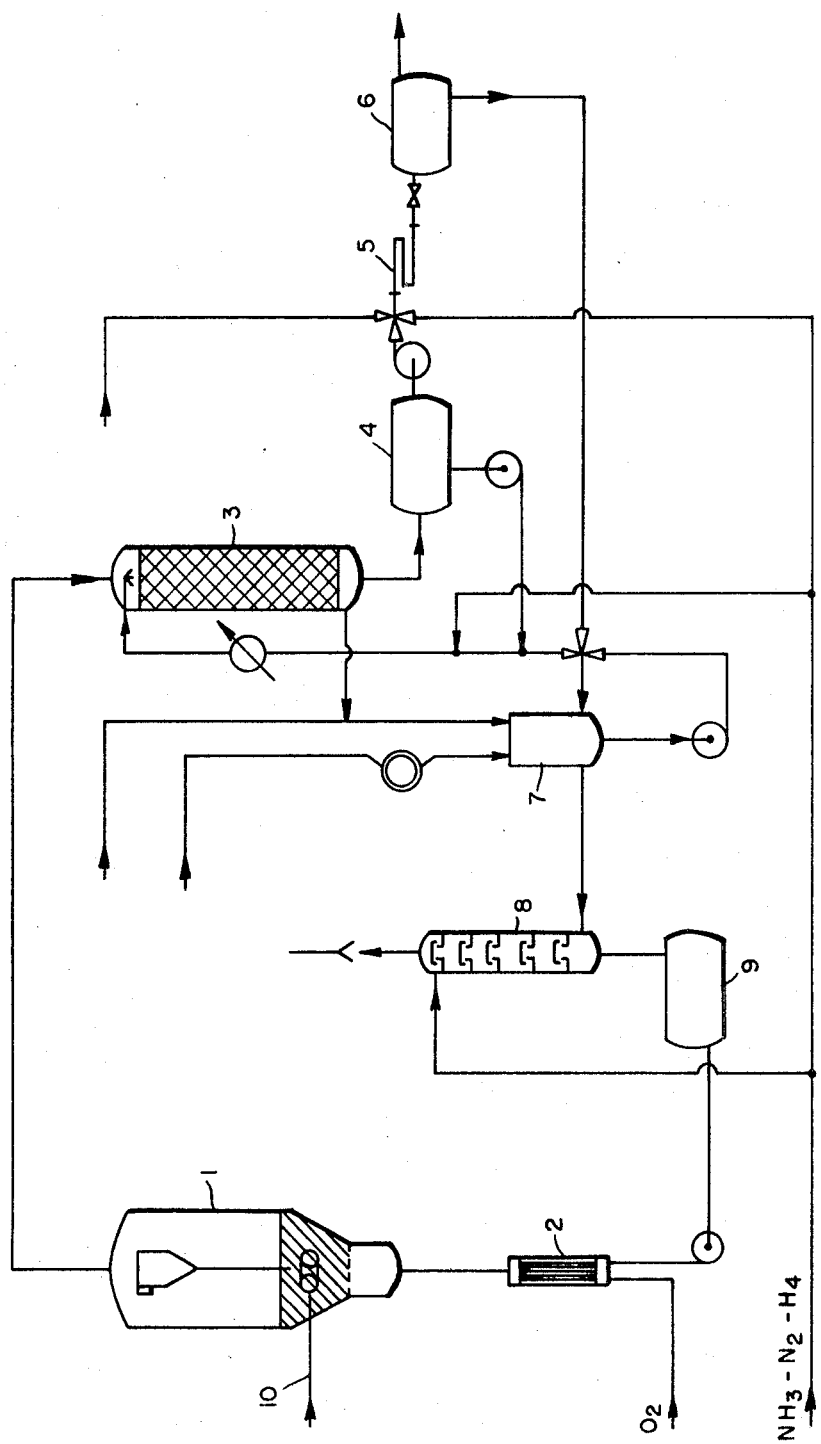

3,592,600
RECOVERING BROMINE AND IODINE FROM REACTION PRODUCTS OF OXYDEHYDROGENATIONS
Rolf Platz, Mannheim, and Karl Gerhard Baur, Ludwigshafen (Rhine), Germany, assignors to Badische Anilin- & Soda-Fabrik Aktiengesellschaft, Ludwigshafen (Rhine), Germany
Filed Sept. 6, 1968, Ser. No. 757,938
Claims priority, application Germany, Sept. 7, 1967,
P 16 43 659.2
Int. Cl. C01c 1/16
U.S. Cl. 23—216                                 6 Claims

ABSTRACT OF THE DISCLOSURE

The recovery of bromine and/or iodine from the reaction products of oxydehydrogenations of hydrocarbons in which bromine and/or iodine serves as a catalyst, wherein the reaction product leaving the reactor is treated with an aqueous ammonia solution to which has been added an amount of hydrazine sufficient for the reduction of the elementary constituents. The aqueous phase is separated and the byproducts containing bromine and/or iodine separated in the working up of the organic phase are burnt with oxygen-containing gases and the gas from the combustion is scrubbed with an ammonia solution containing hydrazine.

---

The present invention relates to a new process for recovering bromine and iodine from reaction products of oxydehydrogenations of hydrocarbons.

Many saturated organic compounds can be converted into the corresponding unsaturated compounds under the catalytic influence of halogens, particularly bromine or iodine, at elevated temperatures with oxygen or air. In this process (known as oxydehydrogenation) the halogen used as catalyst is usually supplied to the reactor in elementary form together with the compound to be dehydrogenated and leaves the reactor together with the reaction product in the form of elementary halogen, hydrogen halide or halogen in organic combination.

Separation and recovery of the catalyst in as simple and as quantitative a manner as possible from the reaction product obtained is of particular importance in carrying out the oxydehydrogenation. The aim is to convert the halogen into a form in which it can be returned direct to the reactor. It is also important that the reaction product obtained should be completely freed from bromine and iodine because even traces of these disturb further processing considerably. For example contamination to the extent of a few p.p.m. of iodine of a styrene prepared by oxydehydrogenation causes marked discoloration in the production of copolymers of styrene and acrylonitrile.

It is the object of the present invention to enrich the technology of oxydehydrogenations by the provision of a process for the removal of constituents containing bromine and/or iodine from the desired reaction product and for the return of these halogens to the reaction.

We have found that bromine and/or iodine are completely recovered from the reaction products of oxydehydrogenations and at the same time the reaction products are freed from these elements and compounds of these elements when the reaction product leaving the reactor is treated with an aqueous ammonia solution to which an amount of hydrazine has been added which is sufficient for reduction of the elementary constituents, the aqueous phase is separated and the byproducts containing bromine and/or iodine separated in the working up of the organic phase are burnt with oxygen-containing gas and the reaction gas is washed with an ammonia solution containing hydrazine.

The bromine and/or iodine (hereinafter referred to as halogens) supplied to the reactor (as a rule originally as ammonium bromide and/or ammonium iodide) leave the reactor with the reaction product, excess oxygen or air and byproducts in the gas phase in the form of elementary halogens, hydrogen halides and organic halogen compounds. Normally the major portion of the halogens is present in the discharge as hydrogen halides. The remainder of the halogens occur in about equal amounts in elementary form and in the form of organic halogen compounds. For example in the continuous dehydrogenation of ethylbenzene with oxygen in the presence of iodine, from 70 to 95% by weight of the iodine supplied to the reactor is present in the discharge in the form of hydrogen iodide, while about 2.5 to 15% by weight in each case leave the reactor in the form of elementary iodine and in the form of organic iodine compounds.

In carrying out the process according to this invention, the halogen used as catalyst is converted quantitatively into ammonium halide and recycled to the reactor as such for further use. In the treatment of the gas leaving the reactor with an aqueous ammonia solution, the fraction which is present as hydrogen halide is converted into ammonium halide. The elementary halogen component is first reduced by hydrazine to hydrogen halide and then converted into the ammonium halide in the same way.

The ammonia and hydrazine are advantageously used in a slight excess, about up to 1.2 times the stoichiometric amount. Determination of the amount required can be monitored analytically. Ammonium halides may be used without difficulty as catalysts in oxydehydrogenations because they are converted into elementary halogen, nitrogen and steam in the presence of oxygen under the reaction conditions, i.e. at temperatures above 400° C.

Treatment of the gaseous reaction products with the aqueous ammonia - hydrazine solution may be carried out for example cocurrently in a packed column, the dehydrogenation product being condensed. The ammonia-hydrazine solution is circulated through a cooling system to withdraw the heat from the reaction products. If the treatment of the hot reaction gas is carried out with a cold extraction liquid (the aqueous hydrazine solution) it may be referred to as quenching.

The quenching liquid is worked up by distillation, the byproducts containing halogen being separated. These byproducts, which occur for example as first runnings and as residue in the distillation, are advantageously combined and supplied to a combustion plant. It is advantageous to use as the combustion plant a muffle furnace lined with ceramic material into which the byproducts containing halogen are sprayed and burnt with an excess of air or other oxygen-containing gas. If the byproducts to be burned have a high viscosity it is advantageous to heat them prior to spraying. The combustion muffle furnace may also have the offgas from the oxydehydrogenation supplied to it and burn together with the organic byproducts. This offgas consists mainly of combustion products and pyrolysis products of the compounds to be dehydrogenated or of the reaction product obtained in the dehydrogenation, as for example carbon monoxide, ethylene and methane. This offgas also contains small amounts of halogen, usually in the form of alkyl halides.

The halogen in organic combination is converted into the elementary condition by the combustion of the halogen-containing byproduct; it is separated from the hot combustion gas by extraction for example countercurrently in a bubble tray column with an aqueous ammonia solution containing hydrazine, the halogen thus being reduced and converted into ammonium halide. The combustion gas leaving the scrubbing column at the top no longer contains halogen. The supply of ammonia and hydrazine to the top of this column is preferably carried out in only a slight excess in order to prevent the formation of ammonium carbonate from ammonia and the carbon dioxide formed in the combustion of the organic substances. To avoid loss of ammonia, the combustion gas leaving the top of the scrubbing column may be scrubbed with fully demineralized water to free the gas from ammonia and ammonium carbonate. Corrosion phenomena due to bromine or iodine are advantageously avoided in the scrubbing column by cooling the combustion gas from about 1000° C. to a temperature which is permissible for the material of the column by spraying in water prior to the entry of the combustion gas into the scrubbing column made of metallic material.

All the ammonium halide solutions obtained in the process are advantageously united and concentrated prior to return into the oxydehydrogenation to a concentration approximately equal to saturation. In an advantageous embodiment of this process the dilute solution which is obtained by washing the combustion gas is added to the circulating quench liquid and a branch stream thereof is continuously withdrawn, concentrated and returned to the reactor. During the concentration all the water of reaction formed during the dehydrogenation and further amounts of water introduced into the circulating quench liquid by adding the solution of hydrazine hydrate and ammonia is evaporated.

It has proved to be particularly advantageous to utilize the heat formed by combustion of the organic byproducts containing halogen for concentrating the dilute ammonium halide solutions. This may be done by direct injection of the ammonium halide solution to be concentrated into the hot reaction gas from the combustion, the reaction gas being cooled in the desired manner at the same time. The scrubbing column charged with hydrazine and ammonia for absorption of the halogens is kept at boiling temperature so that the whole of the amount of water to be evaporated leaves this column in the gas phase with the reaction gas freed from halogens. The amount of heat liberated by combustion of the byproducts is greater in most cases than the amount of heat required for evaporation of the water. If this is not the case, further heat can be supplied from outside.

Working up the reaction products from the oxydehydrogenation may also offer difficulties if halogen compounds (which are always contained in these reaction products) undergo chemical change with elimination of the halogens. In this case the halogens, on account of their high vapor pressure, pass in small amounts into the purified reaction products and react with the unsaturated compounds. Even very small amounts of halogen may often greatly disturb the further processing and use of the products. Moreover these amounts of halogen contained in the end products are lost as catalyst and in a continuous process have constantly to be replaced by adding fresh amounts of halogen.

In order that these losses or impairment of the purity of the dehydrogenation products may also be avoided, the whole organic phase may be contacted, prior to the distillative working up, with an aqueous solution of ammonia containing hydrazine at elevated temperature while maintaining a residence time which is adequate to destroy the byproducts which eliminate halogen, the aqueous solution separated and united with the main stream of solution containing ammonium bromide and/or ammonium iodide. The treatment of the organic phase may be effected for example by stirring or by countercurrent extraction. If the temperature necessary for thermal decomposition of the halogen-eliminating byproducts is above the boiling point of the reaction product obtained in the oxydehydrogenation, the treatment may also be carried out at increased pressure, for example in a direct or indirect heated coiled tube. For example styrene prepared by oxydehydrogenation of ethylbenzene in the presence of iodine contains only 1 to 2 p.p.m. of iodine after it has been treated with hydrazine and ammonia at 200° C., 16 atmospheres, a residence time of two minutes followed by purification by distillation. By this measure the elimination of halogen from the unstable halogen-containing byproducts is brought about prior to the distillation and the halogen liberated is transferred to the aqueous phase as ammonium halide by the presence of the hydrazine and ammonia.

In order that the ammonium halide in being returned to the reactor should be oxidized again as rapidly and completely as possible into the catalytically active halogen, it is often advisable to carry out this reaction in a preliminary reactor. In this case the concentrated ammonium halide solution may be supplied together with oxygen or oxygen-containing gas to the prereactor and applying to this prereactor by direct or indirect heating the amount of heat necessary for evaporation of the water serving as solvent for the ammonium halide. The halogen liberated from the ammonium halide is then supplied in gas phase to the reactor with the oxygen required for the oxydehydrogenation.

The process according to the invention may be used with particular advantage in the oxydehydrogenation of ethylbenzene to styrene and of methyl isobutyrate to methyl methacrylate because in both cases a high degree of purity is important for the further processing of the products. Dehydrogenation products which have been purified in accordance with the process of this invention contain only 1 p.p.m. or less of bromine or iodine.

The invention is illustrated by the following examples.

EXAMPLE 1

A reactor 1 (see the drawing) has 5 kg. per hour of ethylbenzene supplied to it through line 10. At the same time 285.4 g. of ammonium iodide in the form of a saturated aqueous solution is supplied per hour. Ammonium iodide is converted into elementary iodine, nitrogen and water in the reactor by the supply of oxygen at elevated temperature. In the presence of iodine, ethylbenzene is converted by oxygen into styrene. The reaction gas leaving the reactor is cooled and scrubbed in a column 3 cocurrently with a dilute aqueous ammonia solution. This ammonia solution has added to it per hour (with continual control of the pH and redox potential) 50 g. of $NH_3$ in the form of an aqueous solution and 5 g. of hydrazine in the form of a dilute aqueous solution. Both ammonia and hydrazine are continually present in excess in the recycled quench liquid.

4350 g. of an organic phase separates per hour in a separating vessel 4; it consists mainly of styrene with small amounts of unreacted ethylbenzene and byproducts. This organic phase contains 1.22% by weight of iodine which is equivalent to 53.1 g. of iodine per hour or 21.24% of the amount of iodine introduced. 78.76% of the amount of iodine supplied, i.e. 196.9 g. per hour, is converted into ammonium iodide in the scrubbing column 3 by reduction with hydrazine followed by neutralization with ammonia. 224.8 g. per hour of ammonium iodide are obtained in the aqueous phase which together with the water of reaction formed in the dehydrogenation is supplied to concentration.

The organic phase which separates in the separating vessel 4 is pumped through a coiled pipe 5 under superatmospheric pressure at 200° C. and a residence time of two minutes in the presence of hydrazine and ammonia to destroy unstable organic iodine compounds. In this way 5.1 g. per hour of iodine is converted into ammonium iodide so that in this reactor 5.8 g. of ammonium iodide per hour is formed and is supplied, after phase separation in a separating vessel 6, to concentration with the major portion of the ammonium iodide. 48.0 g. of iodine per hour occurs in the form of organic iodine compounds in the residue of the crude distillation and in the first runnings and residue of the subsequent pure distillation. These first runnings and residues containing iodine are united and completely burned with an excess of air in a muffle 7. The offgas from the reaction is supplied to the muffle at the same time. Thus 48.0 g. of elementary iodine per hour is present in the burnt gas leaving the muffle at about 1000° to 1100° C. and this is converted also into ammonium iodide by scrubbing in a column 8 with the ammonium iodide solution to be evaporated and by adding an excess of hydrazine and ammonia. During the evaporation of the ammonium iodide solution, 54.8 g. per hour of ammonium iodide is formed by reaction and neutralization from the elementary iodine and this is returned together with the major portion of the ammonium iodide through a separating vessel 9 and a prereactor 2 into the reactor 1. 285.4 g. of ammonium iodide in all is returned to the reactor. The iodine content of the pure styrene is 1 p.p.m. Other loss of iodine may occur only by traces of iodine in the burnt gas from the combustion of the residues. The iodine content in this gas is 1 mg./m.$^3$.

EXAMPLE 2

5 kg. of methyl isobutyrate and 342.5 g. of ammonium iodide in the form of a saturated aqueous solution are supplied per hour to a reactor. Ammonium iodide in the reactor is converted into elementary iodine, nitrogen and water at elevated temperature by supplying oxygen. Methyl isobutyrate is converted in the presence of iodine and oxygen into methyl methacrylate. The reaction gas leaving the reactor is cooled and washed cocurrent in a column with a dilute aqueous ammonia solution. 50 g. of NH$_3$ in the form of an aqueous solution and 8 g. of hydrazine in the form of a dilute aqueous solution are supplied per hour to the said ammonia solution with constant control of the pH and redox potential. Ammonia and hydrazine are continuously present in excess in the recycled quench liquid.

4810 g. per hour of an organic phase (consisting of unreacted methyl isobutyrate, methyl methacrylate and byproducts) separates in a separating vessel. The organic phase contains 1.56% by weight of iodine, equivalent to 75.9 g. of iodine per hour or 25.3% of the amount of iodine introduced. 74.7% of the amount of iodine introduced (i.e. 224.1 g. of iodine) is converted into ammonium iodide in the scrubbing column by neutralization with ammonia or reduction with hydrazine followed by neutralization with ammonia. 255.9 g. of ammonium iodide per hour thus occurs in the aqueous phase and is supplied together with the water of reaction formed in the dehydrogenation to be concentrated.

The organic phase separated in the separating vessel is subjected to a crude distillation to destroy unstable iodine compounds and to separate isobutyric acid and methacrylic acid. Methyl isobutyrate, methyl methacrylate and low boiling point contaminants are thus separated from the acids and from the residue. The distillate is treated in a stirred container (to which 2 g. of hydrazine and 20 g. of ammonia per hour are supplied) at 20° to 30° C. with an aqueous mixture of hydrazine and ammonia. In this way 7.6 g. of iodine per hour is converted into ammonium iodide so that in this reactor 8.7 g. of ammonium iodide per hour is formed which is supplied, together with the major portion of the ammonium iodide, to be concentrated. 68.3 g. of iodine occurs per hour in the form of organic iodine compounds in the residue of the crude distillation and in the first runnings and residue in the subsequent pure distillation.

The first runnings and residues containing iodine are united and completely burnt with an excess of air in a muffle. This muffle has the offgas from the oxydehydrogenation supplied to it at the same time. There are thus 68.3 g. of elementary iodine per hour contained in the burnt gas leaving the muffle at about 1000° to 1100° C., and this iodine is converted into ammonium iodide by scrubbing with the ammonium iodide solution to be evaporated and by adding an excess of hydrazine and ammonia. During the concentration of the ammonium iodide solution 77.9 g. per hour of ammonium iodide is formed by reduction and neutralization from the elementary iodine; this ammonium iodide is returned to the reactor together with the major portion of the ammonium iodide. A total of 342.5 g. per hour of ammonium iodide is returned to the reactor. The pure methyl methacrylate contains 1 p.p.m. of iodine. Further loss of iodine can only occur by traces of iodine in the burnt gas from the combustion of the residues. The iodine content of the burnt gas is 1 mg./m.$^3$.

We claim:
1. A process for the recovery of bromine and/or iodine as ammonium bromide and/or ammonium iodide from the reaction products formed in the oxydehydrogenation of organic compounds in which bromine and/or iodine originally in the form of their ammonium salts together with oxygen serves as the catalyst which comprises:
   (a) quenching the reaction product leaving the reactor with an aqueous ammonia solution to which an amount of hydrazine adequate for reduction of the elementary constituents has been added,
   (b) separating the aqueous phase,
   (c) working up the organic phase by distillation,
   (d) burning the byproducts containing bromine and/or iodine separated during the distillation step to the organic phase with gas containing oxygen,
   (e) scrubbing the gas from the combustion with an aqueous ammonia solution containing hydrazine to form an aqueous solution containing ammonium bromide and/or ammonium iodide, and thereafter,
   (f) concentrating said aqueous solution and returning at least a portion of said aqueous solution to said reactor.

2. A process as claimed in claim 1 wherein the offgas from the oxydehydrogenation is supplied to the combustion furnace for the organic byproducts containing bromine and/or iodine.

3. A process as claimed in claim 1 wherein the heat liberated by combustion of the organic byproducts containing halogen is used by direct cooling of the burnt gas with the dilute ammonium bromide and/or ammonium iodide solution occurring in the process for the concentration of these solutions of the concentration required for recycling.

4. A process as claimed in claim 1 wherein the organic phase from the oxydehydrogenation is brought into contact with an aqueous ammonia solution containing hydrazine (prior to the distillative working up at elevated temperature and while maintaining a residence time adequate for the destruction of the byproducts eliminating bromine and/or iodine), the aqueous solution is separated and united with the main stream of dilute ammonium bromide and/or ammonium iodide solution prior to the concentration of the latter.

5. A process as claimed in claim 1 wherein the concentrated ammonium bromide and/or ammonium iodide solution is reacted in a prereactor at eleveated temperature with oxygen or air and the halogen liberated is supplied to the oxydehydrogenation in the gas phase.

6. A process as claimed in claim 1 wherein the solution obtained by scrubbing the burnt gas is united with the aqueous phase separated after the quenching of the reaction product prior to the concentration of the former.

References Cited

UNITED STATES PATENTS

| | | | |
|---|---|---|---|
| 3,383,177 | 5/1968 | Metaizeau | 23—219 |
| 3,405,195 | 10/1968 | Sanborn et al. | 23—100X |
| 3,471,251 | 10/1969 | Szezodry | 23—100 |

OTHER REFERENCES

Partington, J. R.: A Textbook of Inorganic Chemistry, sixth edition, MacMillan & Co., London, 1950, pp. 528–9.

OSCAR R. VERTIZ, Primary Examiner

G. O. PETERS, Assistant Examiner

U.S. Cl. X.R.

23—100